March 17, 1931.  A. R. POLLASKY  1,796,939
SPACING MECHANISM
Filed Dec. 30, 1927    7 Sheets-Sheet 3

Inventor
Arthur R. Pollasky
By Ira Milton Jones
Attorney

March 17, 1931.  A. R. POLLASKY  1,796,939
SPACING MECHANISM
Filed Dec. 30, 1927  7 Sheets-Sheet 4

Patented Mar. 17, 1931

1,796,939

UNITED STATES PATENT OFFICE

ARTHUR R. POLLASKY, OF MILWAUKEE, WISCONSIN

SPACING MECHANISM

Application filed December 30, 1927. Serial No. 243,577.

This invention relates to certain new and useful improvements in spacing mechanisms and refers more particularly to an apparatus adapted for use with punching machines, cutting-off machines and various woodworking machines; the present embodiment being applied to a machine for the punching of angle iron, channel or I-beams, and plate material.

Machines of this type have been built, but as the majority thereof more or less contemplate an entirely automatic equipment many objections have been made thereto, due to their necessarily complicated structure and consequently large cost of production and service, and this invention has as an object the provision of an improved apparatus of the character described which is of extremely simplified construction to insure a high standard of efficiency and low cost of manufacture and maintenance.

Another object of this invention resides in the provision of a machine of the class described which is capable of being operated and controlled by one man.

Another object of this invention resides in the provision of an improved apparatus of the character described which will permit the punching of both legs of an angle iron at one setting-up operation.

Another object of this invention resides in the provision of an improved apparatus of the character described, in which all punching operations may be gauged from one edge whereby inaccuracy in the width of the material being punched will not disturb the accuracy of the punchings.

Another object of this invention resides in the provision of an improved spacing device for punching machines and the like, in which one end of the work is carried by a carriage having means for successively engaging a series of stops arranged at predetermined intervals along a templet, and in which each stroke of the punch head releases the means engaging the stop to permit the work to be advanced until the next stop is engaged.

It is another object of this invention to provide an improved device wherein the same templet carried stop pin which cooperates with the carriage stopping mechanism to position the work, acts as a resetting member for the movable stop after the same has been rendered inoperative to permit the advancement of the work.

A further object of this invention resides in the provision of an improved apparatus of the character described having a pair of templets so arranged whereby one templet controls the spacing and setting of the work during the forward movement of the work and the other functions during the return movement.

A still further object of this invention resides in the provision of an improved apparatus of the character described having a plurality of operative rams and suitable control mechanism therefor whereby shifting of the various devices is accomplished without manual exertion on the part of the operator.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which.

Referring now more particularly to the accompanying drawings in which like numerals designate like parts throughout the several views, 5 designates a feed table, 6 a spacing table and 7 a punching means interposed between the tables, the work 8 illustrated in Figures 1 to 22, inclusive, is an angle iron which is placed on the feed table and gripped by a carrying mechanism, to traverse the punching mechanism in a manner to be described.

Figures 1, 2:
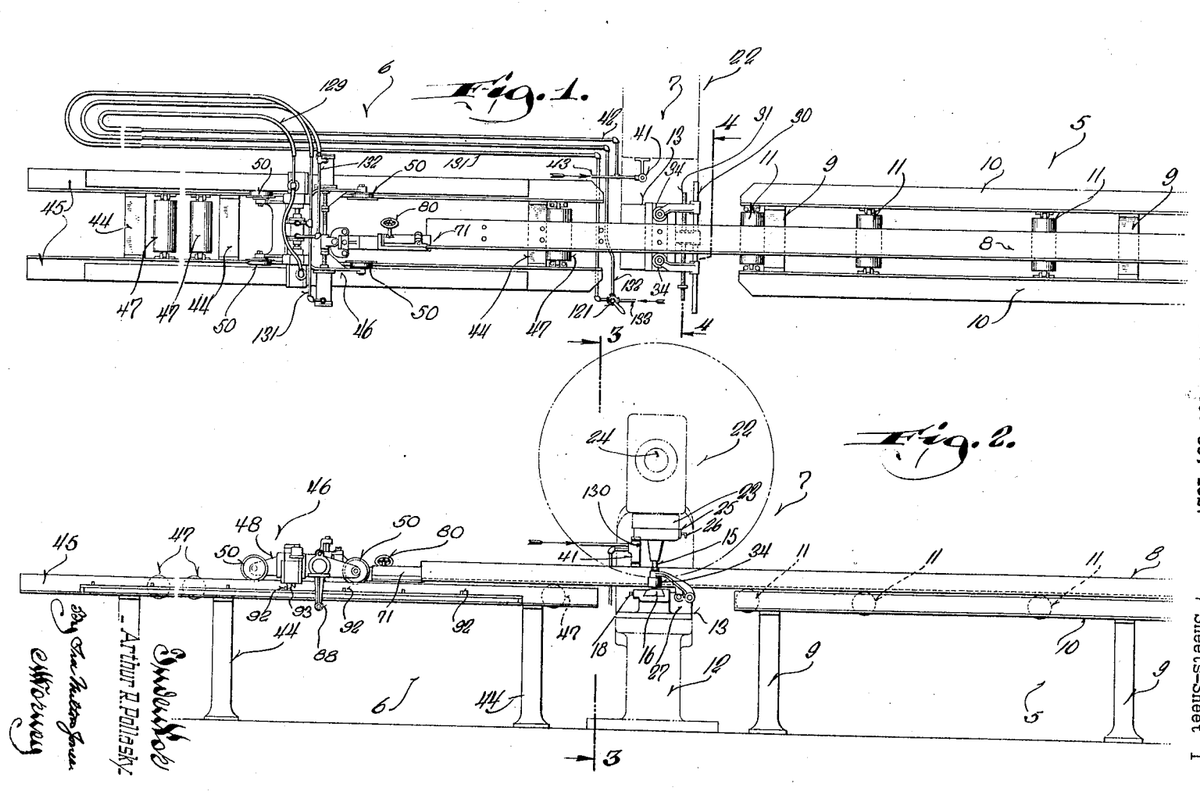
Figure 1 is a top plan view of an improved machine embodying my invention.
Figure 2 is a front side elevational view thereof.

The feed table consists of a plurality of standards 9 connected at their top by a pair of longitudinally spaced angle members 10 between which a plurality of rollers 11 are journaled which provide means for freely longitudinally slidably supporting work placed thereon. The feed table is of a length dependent upon the shop in which it is placed and the work it is desired to handle.

Figure 3:
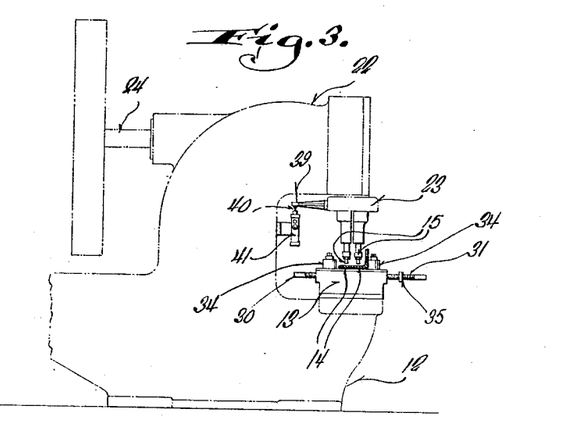
Figure 3 is a view looking at the punch press proper through Figure 2 on the plane of the line 3—3.
Figure 6:
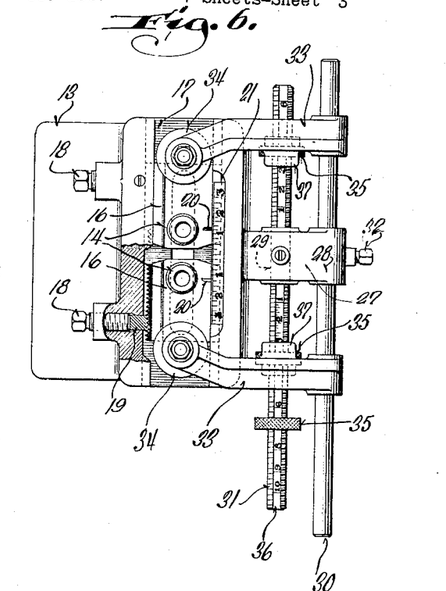
Figure 6 is a view, partly in top plan and partly in section, taken through Figure 5 on the plane of the line 6—6 illustrating the gauging means for the guide rollers and the female die-blocks.
Figure 7:
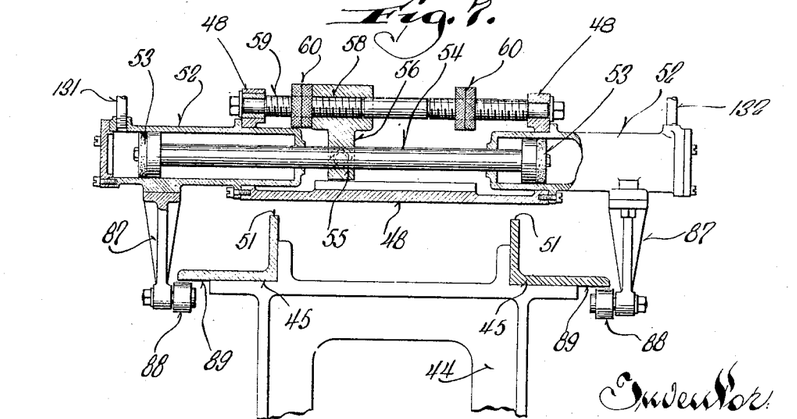
Figure 7 is a fragmentary, detail view, partly in section and partly in elevation, taken through Figure 8 on the plane of the line 7—7 and illustrating the adjusting and gauging means for the work holding chuck.

The punching apparatus may be of any special design or construction and consists of a main frame 12 having a bed or base plate 13 on which the female die block or blocks 14 are mounted to cooperate with movable male dies or punches 15. The female dies are carried by blocks or slides 16 guided in a transverse channel or groove 17 in the bed plate or base 13 for adjustment to vary the distance between their centers, and are held in their adjusted position by set screws 18 forcing locking members 19 having their inner ends serrated against the serrated edges of the blocks. The blocks preferably have depressed or raised indicating means 20 at their other edges for cooperation with a scale 21 formed along the adjacent edge of the fe-groove 17 so that the adjustment of the female dies may be readily accomplished.

The head 22 of the punch press over-hangs the bed plate 13 and has a removable cap 23 in which the punches 15 are slidably mounted to be operated from a shaft 24 rotatable in the head by suitable mechanism, not shown. The conventional gags 25 are slidable in the cap 23 and have the usual handles connected therewith for rendering any one or more of the punches 15 inoperative and as this structure is common to presses of this type further detailed description is deemed unnecessary.

Figure 4:
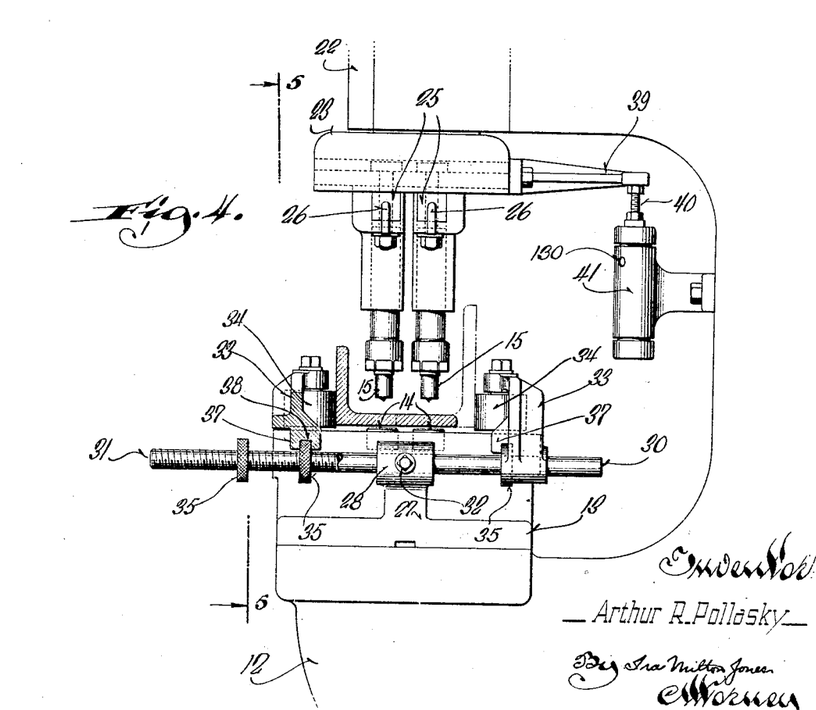
Figure 4 is an enlarged, fragmentary detail view, partly in section and partly in elevation, taken through Figure 1 on the plane of the line 4—4.
Figure 5:
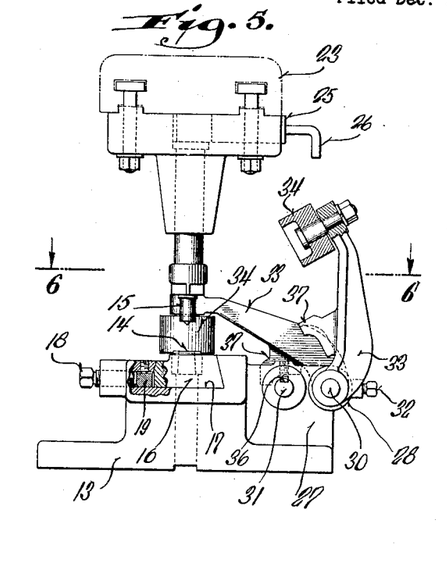
Figure 5 is an enlarged fragmentary view, partly in section and partly in elevation, taken on the plane of the line 5—5 of Figure 4 and illustrating one of the guide rollers as elevated prior to being shifted to a second position.

The bed plate 13 has a side extension 27 provided with transverse bores or bearings 28 and 29 in its upper end in which shafts 30 and 31 are fixed, respectively. Shafts 30 and 31 are transversely disposed with respect to the plane of movement of the work and the shaft 30 is removably secured in its bearing by a set screw or other means 32 and has a pair of arm members 33 freely slidably and pivotally mounted thereon which rotatably mount guide rollers 34 at their outer ends, one of the rollers being engageable with one longitudinal edge of the work as it traverses the punch in one direction and the other with the opposite edge as it is moved in the opposite direction. Adjustment of the rollers with respect to the female dies is obtained by disc members 35 adjustably threaded on the shaft 31 which has its top surface flattened, as at 36, and suitably graduated to facilitate the positioning of the disc members.

Each lever 33 has an extension 37 on its lower surface with a recess or aperture 38 therein to fit over the periphery and sides of the members 35. In this manner a plurality of the members 35 may be adjusted on the rod 31 and the lever then moved along the rod 30 to engage any desired disc 35 and thus eliminate the necessity of resetting the discs for each change of adjustment as will be readily apparent.

Fixed to the cap 23 is an extension 39 which is engageable with the adjustable stem 40 of an air valve 41 supported from the frame 12 in the manner best shown in Figures 3 and 4, the air valve being disposed between air lines 42 and 43 and operating the stop mechanism of the spacing table as will be later described, after each operation of the punching apparatus.

The spacing table is similar to the feed table and comprises a plurality of up-rights or standards 44 connected at their upper ends by a pair of longitudinal, spaced angle irons 45, the vertical flanges of which provide tracks for the work positioning mechanism carriage 46 to be later described, there being transverse roller members 47 journaled between the angle iron frame similar to the feed table to support the work as it passes thereover, after passing the punching mechanism.

Figure 8:
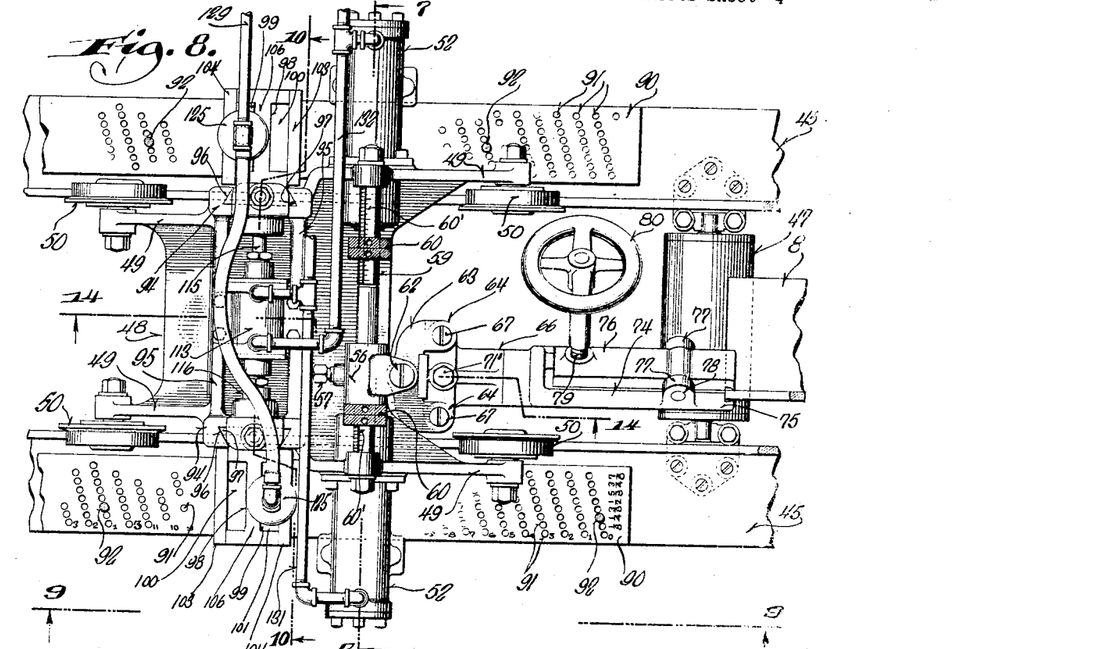
Figure 8 is a fragmentary top plan view illustrating the carriage member and cooperating templets.
Figure 9:
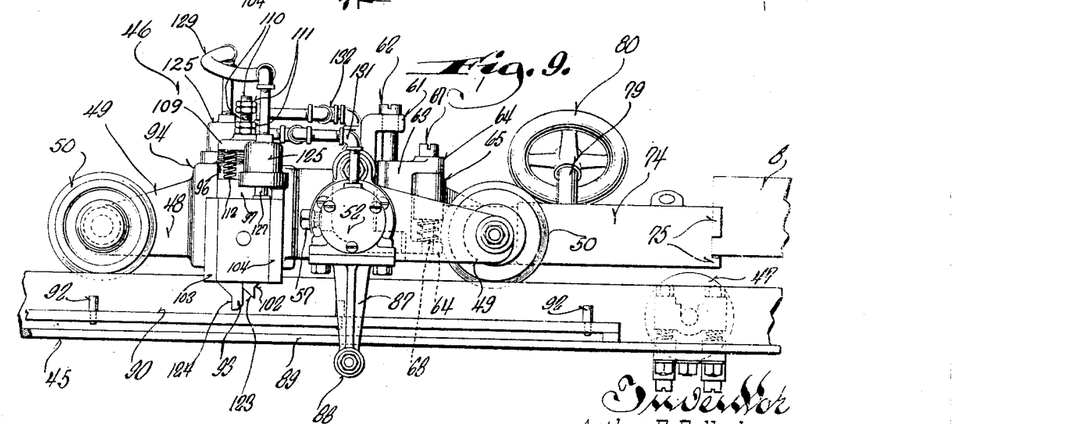
Figure 9 is a side view of the carriage looking at Figure 8 on the plane of the line 9—9.
Figure 10:
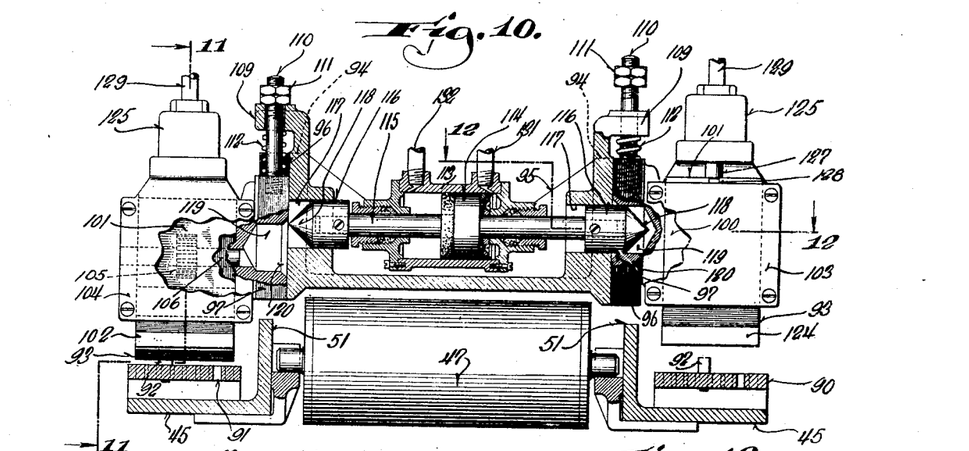
Figure 10 is a view, partly in section and partly in elevation, taken through Figure 8 on the plane of the line 10—10.

The carriage 46 preferably consists of a cast frame 48 having a pair of spaced forward and rearward extensions 49 from which flanged wheels 50 are rotatably supported by roller bearings or other means, the wheels tracking upon the vertical flanges 51 of the angle irons 45. A pair of diametrically opposed rams or cylinders 52 are transversely secured to opposite sides of the frame 48 and their pistons 53 are connected by a common rod 54 so that they work in unison, the rod 54 passing through the transverse bore 55 of a clevis structure 56 in which it is secured by a set screw or other means 57. The clevis also has a bore 58 which is parallel to the bore 55 and through which a rod 59 slidably passes, the rod 59 being secured to the sides of the frame 48 and serving to strengthen the carriage structure. The ends of the rod 59 are threaded and have adjustable stops 60 threaded thereon against which the clevis 56 abuts to limit its sidewise movement under the action of the rams 52. Adjustment of the stop is facilitated by graduations 60' formed in a milled slot extending throughout the threaded portions of the rod. A pair of vertically spaced lugs or projections 61 is extended from the clevis 56 to receive a clevis pin 62 which pivotally and vertically slidably connects an approximately U shaped yoke member 63 with the clevis, the bolt 62 passing through the center portion of the yoke which is of a thickness less than the space between the lugs 61.

Figure 14:
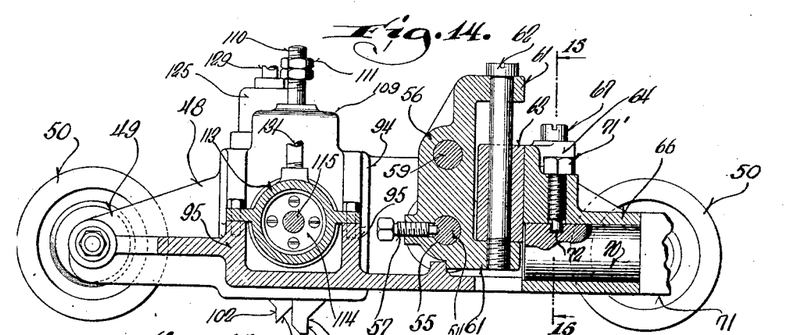
Figure 14 is a view, partly in elevation and partly in section, taken through the carriage and specifically illustrating the manner of connecting the work engaging clamp therewith, said view being taken through Figure 8 on the plane of the line 14—14.
Figure 15:
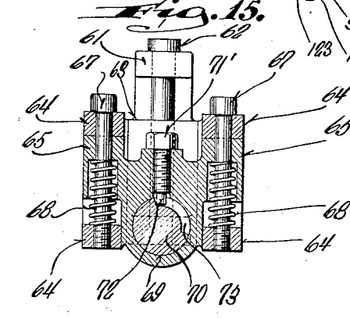
Figure 15 is a view taken transversely through Figure 14 on the plane of the line 15—15 and illustrating the yieldable and rotatable connection of the work clamp with the carriage clevis.
Figure 16:
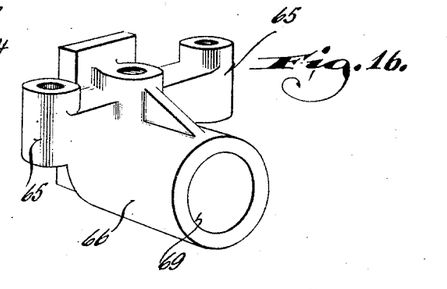
Figure 16 is a perspective view of the boot or socket member with which the work engaging clamp is rotatably connected and which in turn is adjustably connected with the carriage clevis.

The ends of the yoke member are bifurcated to form vertically spaced lugs 64 between which, bushings or sleeves 65 of a boot or socket member 66 are vertically adjustable on pins 67 connecting the lugs, the sleeves 65 being of less thickness than the space between the adjacent lugs 64 and having their lower ends counterbored into which extensile springs 68 coiled about each pin 67 extends, the springs 68 normally retaining the boot or socket member in its uppermost position illustrated in Figure 15. The boot or socket member is longitudinally bored, as at 69, to receive the journal 70 of a work engaging clamp or chuck member 71, to be later described, the journal 70 being detachably retained in the boot or socket member against longitudinal movement but permitting rotation through approximately 90 degrees by a set screw 71' threaded in the socket member with an end 72 extended into the bore 69 to engage within an arcuate slot 73 in the journal 70, the length of the slot limiting the rotation of the journal within the socket member.

Figure 17:
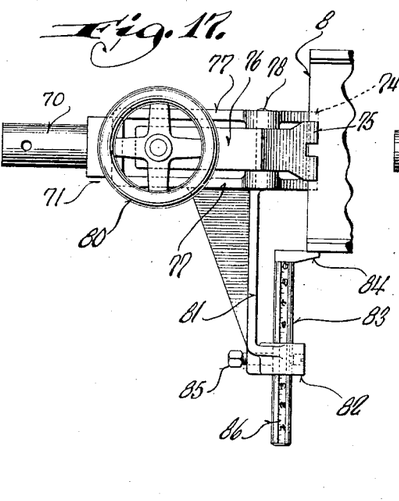
Figure 17 is a top plan view of the work clamp and its cooperating gauge, adapted for use with channels and flat plates.
Figure 18:
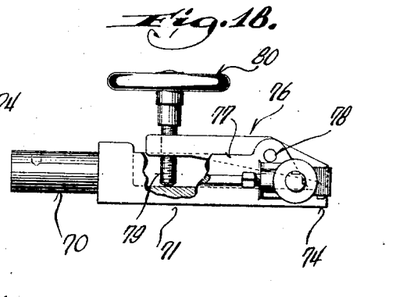
Figure 18 is a side elevational view, with parts in section, thereof.

As angle irons and channels or plates require different types of chucks, two constructions have been provided which are readily interchangeable, that type illustrated in Figures 8 and 9 being adapted for use with angle irons and that type depicted in Figures 17 and 18 being used with channels or plates, and while their construction varies the principle of operation is common to both.

The chuck member used with angle irons swivels on its journal 70 to bring either leg of the angle iron work to punching position and is approximately L shaped in cross section, the angularly disposed walls thereof being cut away at their ends to provide fixed jaws 75 which engage the outer faces of the angle iron work. A cooperating jaw or lever member 76 is medially pivoted between lugs 77 extended from the walls 74, as at 78, and has its forward end urged towards the jaws 75 to clamp the work, by a screw threaded shaft 79 threaded in its rear end and engageable with the bottom of the chuck proper, a hand wheel 80 being provided for manipulating the shaft.

The construction of the chuck member for channels and plates as illustrated in Figures 17 and 18 is substantially the same except that it does not swivel and the body portion thereof is channel shaped instead of L shaped and includes means for mounting a gauge.

The mounting means consists of a lateral arm 81 extended from one side of the chuck and having an apertured guide 82 in which the shank 83 of a gauge device 84 is adjustably positioned by a set screw 85, the shank 83 having suitable designations 86 thereon to facilitate the setting of the gauge.

As the ram cylinders 52 extend beyond the angle irons 45 of the spacing table, bracket arms 87 are extended therefrom and have rollers 88 journaled on their lower ends to track on the under surface of the horizontal flange 89 of the angle beams to retain the carriage on the tracks formed by the vertical portions of the beams.

The carriage, and with it the work, is moved longitudinally in either direction by the operator although automatic advancing means may be provided without departing from this invention, and is provided with novel automatic means for cooperation with templets 90 carried by the angle beams 45 so that its movement is arrested at predetermined intervals to properly position the work according to the set-up of the templet. The templets are each formed with a plurality of inclined parallel series or groups of apertures 91 in which a series of stops or pins 92 are adapted to be inserted according to the spacing desired between the holes to be punched in the work, and stop members 93 carried by the carriage cooperating with the members 92 in the manner about to be described.

Figure 11:
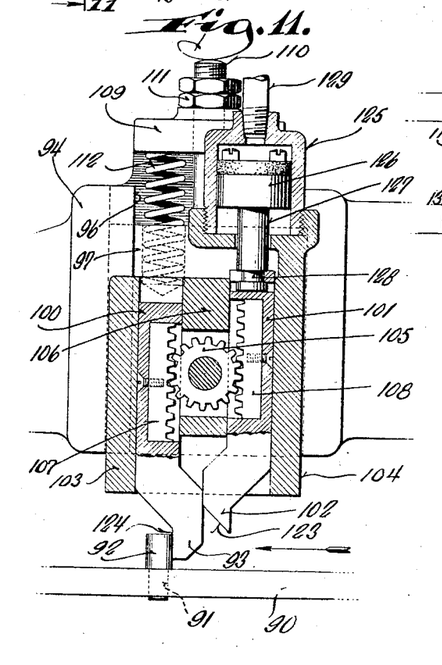
Figure 11 is an enlarged detail view, partly in section and partly in elevation, taken through Figure 10 on the plane of the line 11—11 and illustrating one of the carriage stop devices.
Figures 12, 13:
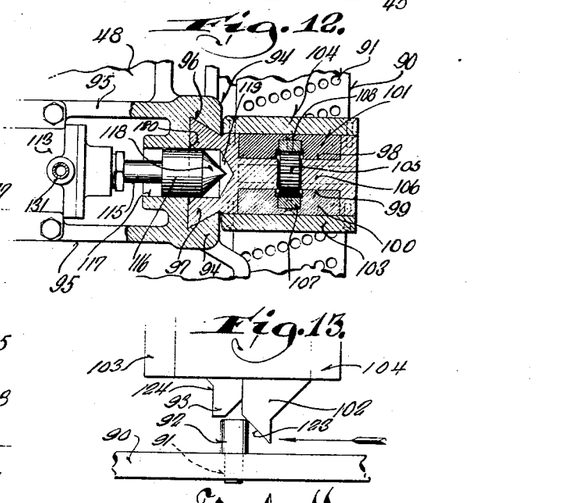
Figure 12 is an enlarged fragmentary detail view, partly in section and partly in elevation, taken through one of the carriage stop mechanisms on the plane of the line 12—12 in Figure 10.
Figure 13 is a fragmentary, detail view of the lower portion of one of the carriage stops illustrating the manner in which the same is reset as it passes over a templet carried stop.

The vertical walls 94 of the carriage, outwardly of the cylinders 52, are reinforced by spaced, transverse ribs 95 and the outer surface of the walls between the ribs 95 are each provided with a vertical dove-tail groove 96 in which a complementary shaped slide block 97 is vertically adjustable. Each block 97 extends outwardly to a point beyond the outer edge of the adjacent templet 90 and has its opposite walls grooved or channeled, as at 98 and 99, in which the upper portion 100 of the stop 93 and the upper portion 101 of a resetting device 102 are slidably secured by plates 103 and 104, an idling gear 105 being centrally journaled in the webs or wall 106 of the block 97 with its periphery extending into the channels 98 and 99 to mesh with racks 107 and 108 carried by the portions 100 and 101, respectively. The walls 94 have centrally apertured guide lugs 109 disposed centrally over the guide grooves 96 through which guide pins 110 carried by the blocks 97 are slidable, suitable stop means 111 being adjustably mounted on the upper ends of the guide pins to limit the downward movement of the blocks 97 and their associated mechanism, a pair of expansile springs 112 confined between a pair of the guide lugs 109 and the top face of the block 97 normally urging the block to its lowermost position with the stop 111 engaging the guide 109, the block 97 being movable against the springs 112 by the pneumatic means now about to be described.

Mounted between the said walls 94 on the transverse ribs 95 is a cylinder 113 in which a piston 114 works its piston rod 115 extending through both ends of the cylinder and having head members 116 on its ends guided within apertures 117 communicating with the dove-tail grooves or channels 96 and having their extreme ends tapered, as at 118, for selective engagement in openings 119 in the inner surfaces of the blocks 97 and which are flared, as at 120, for the reason later described. One block 97 is elevated with its spring 112 in compression while the other is lowermost, the blocks 97 being elevated when the adjacent head 116 is engaged with its aperture 119, the flared portion of the aperture 119 of the other block being so disposed so that a movement theretoward of its adjacent head 116 will cause its tapered end 118 to exert a cam action thereon and elevate the block, the other block dropping to lowermost position under the released energy of its spring 112 as the head 116 is retracted from its aperture 119. The operation of the piston 114 is controlled from a valve 121 in coordination with the pistons 53, as will be later described.

Both stop mechanisms carried by the blocks 97 are identical with the exception that one stop functions during the movement of the carriage in one direction, and in the other during movement in a reverse direction for the reasons later described. Cooperating with the stop is the resetting member 102 which has its lower end 123 tapered upwardly in the direction in which that particular stop mechanism is designed to operate and the stop member 93 has its templet pin or stop engaging surface 124 straight so that when the same is disposed within the path of a pin, continued movement of the carriage and work is arrested and to move the stop 93 out of the path of the pin and allow such continued movement after each punching operation pneumatic means operating on the resetting device 102 are provided, which is as follows:

Fixed to each block 97 directly above the end 101 of the resetting device 102 is a cylinder 125 in which a piston 126 operates having a rod 127 detachably connected with the upper end of the resetting device, as at 128, an air line 129 being connected with both cylinders 125 and being in turn connected with the line 42 leading from the valve structure 41 so that every time the head 23 is depressed in a punching operation, the valve 41 is opened to connect the cylinders 125 with the pneumatic pressure from the supply 43 as a result of which the resetting device 102 is moved downwardly elevating the stop 93 through its connection with the resetting device through gear 105, the port of the valve 41 connected with the line 129 being immediately disconnected from the supply 43 and connected with the atmosphere through an exhaust port 130 after the punching operation so that as the carriage is advanced the setting device 102 will ride over the adjacent pin 92 in a manner illustrated in Figure 13, causing it to be moved into its block 97 exhausting the air within the line 129 through the port 130 and resetting the stop 93 to its position illustrated in Figure 11, so that it will again abut the next stop as the carriage is advanced.

Thus it will be seen that the same pin which stops the carriage also resets the stop mechanism to insure the stopping of the carriage at the next pin, no matter how small the distance between adjacent pins.

As best illustrated in Figures 1 and 8, the ram cylinders 52 are each connected at the outermost ends with the stop cylinder 113 by pipe lines, the ram cylinder 52 shown below the center line in the Figures 1 and 8 being connected with the cylinder 113 at its side farthest from said ram cylinder by a line 131, connected at its source with the port of the valve 121. The other, or upper ram cylinder (with respect to said Figures 1 and 8) is connected with the opposite end of the stop cylinder by a line 132 which is connected to the other outlet port of the valve 121, the valve being at all times common to a source of compressed air through a pipe line 133.

By means of the handle of the valve 121 the operator may selectively connect either one of the pipe lines 131 or 132 with the source of pressure or he may disconnect both lines by placing the handle in a neutral position. With the handle of the valve moved to the right as in Figure 1, the pipe line 132 has been connected with the source of compressed air, and as a result, the upper ram cylinder 52 has functioned to move the clevis 56 and its associated mechanism carrying the work, to the lower side of the center line in Figure 8, which is the front of the machine when viewed from the operator's position. Simultaneously with this movement the air entering the stop cylinder 113 forces its piston 114 towards the back of the machine, moving the rearmost head 116 into the aperture 119 of the adjacent block 97 to raise the rear stop mechanism above the tops of the templet pins to inactive position.

This is the position of the parts throughout the various figures; the front stop mechanism is lowered to its active position to successively engage the pins arranged on the front templet, to position the work according to the set-up of the templet; the clevis 56 and its associated work carrying mechanism is held against the forward stop 60, which has been adjusted to its desired position and the work and carriage are ready to be moved through their forward stroke, being to the left in Figures 1 and 2. As previously stated each punching operation raises the stop 93 to allow the operator to move the work forward, the stop being set to active position by the same pin, is ready to stop the carriage and work at the next pin, the operator's only care being to hold the work against the front guide roller 34 as it is moved and while it is punched.

Figures 19, 20:
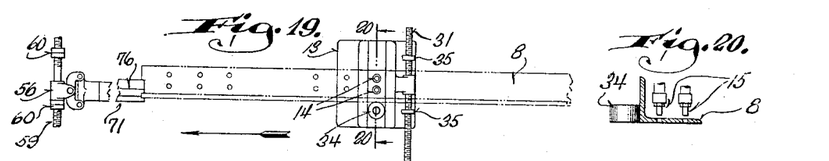
Figure 19 is a schematic view illustrating an angle iron having one leg punched during its forward movement.
Figure 20 is a schematic sectional view, taken through Figure 19 on the plane of the line 20—20.
Figures 21, 22:
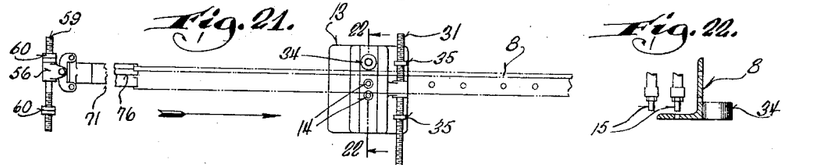
Figure 21 is a view similar to Figure 19 illustrating the other leg of the angle being punched during the return movement.
Figure 22 is a sectional view, taken through Figure 21 on the plane of the line 22—22.

When the forward stroke of the work is completed, and as in the present showing, the work is an angle iron, the operator manually tips or turns it 90 degrees, rocking or pivoting it on its apex, the clamp rotating on its journal as has been described and moves the handle of the valve 121 to the left which causes the clevis and with it the end of the work farthest from the operator to be moved towards the rear of the machine, lowers the rear stop mechanism to active position and raises the front stop mechanism to its inactive position. The operator then moves the end of the work near him to engage the rear guide roller 34 and the parts are in position for the return stroke of the work and carriage, during which the rear templet governs the spacing of the punching operations. These various steps are clearly shown by the diagrammatic showings in Figures 19 to 22, inclusive. In Figure 19 the work is in its forward stroke which is in the direction of the arrow, being gauged by the front guide roller 34, the view 20 showing the position of the punches. In Figure 21 the work has been turned to present its other leg to be punched, the rear guide roller 34 being used and the work traveling in its return direction. As the present instance requires only a single row of holes to be punched on the return stroke, the front punch is gauged in the usual manner.

Thus it will be seen that both legs of an angle iron beam may be punched at one setting up, the one leg having its holes spaced according to the front templet and vice versa.

Figure 23:
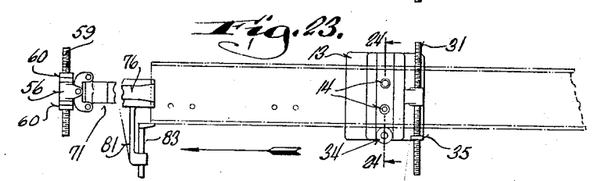
Figure 23 is a view similar to Figure 19 illustrating the punching of a channel beam during the initial or first stroke of the apparatus.
Figure 24:
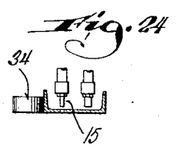
Figure 24 is a sectional view, taken through Figure 23 on the line 24—24.
Figure 25:
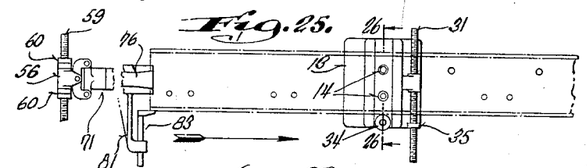
Figure 25 is a view similar to Figure 23 illustrating the punching of the channel beam during the return stroke.
Figure 26:
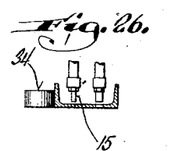
Figure 26 is a view, taken through Figure 25 on the plane of the line 26—26.
Figures 27, 28, 29, 30:
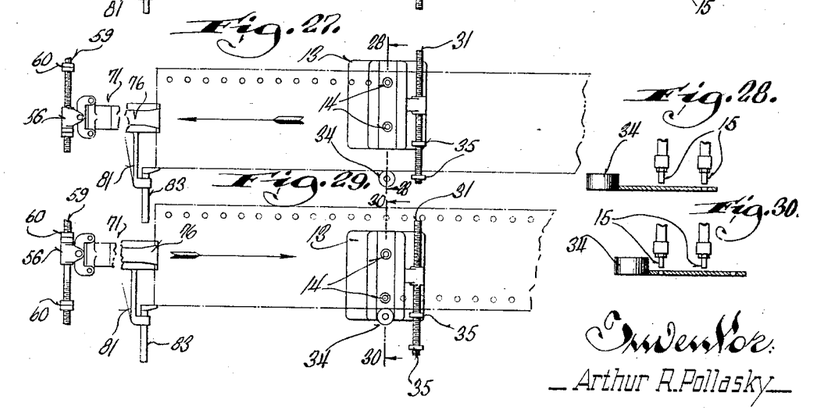
Figure 27 is a view similar to Figure 19 illustrating the punching of a plate during the initial stroke of the carriage.
Figure 28 is a view taken therethrough on the plane of the line 28—28.
Figure 29 is a view similar to Figure 27 illustrating the punching of the plate during its reverse movement.
Figure 30 is a view taken through Figure 29 on the plane of the line 30—30.

In Figures 23 and 26, inclusive, is shown the application of the machine to a channel iron. In punching channels it is advisable that both or all of the rows of holes be gauged from one side edge of the channel and to this end but one guide roller 34 is used being that towards the front of the machine both the forward and return strokes being gauged by this roller.

In this particular instance, this first series of holes which is punched during its forward stroke of the work is of a smaller diameter than that of the second roller or series to be punched during the return movement of the work, and while punching the first series the punch, having a larger diameter, is gagged in the usual manner. Figures 23 and 24 illustrate the positions of the parts while punching the first series of holes and Figures 25 and 26 illustrate the positions of the parts during the return stroke of the work. During this stroke the punch having the smaller diameter is gagged. The gauging devices illustrated in Figures 17 and 18 is utilized while punching channels and is set so as to position the clamping chuck medially with respect to the channel, the stops 60 being adjusted to firmly hold the clevis and its associated parts in the desired punching position.

In Figures 27 to 30, inclusive, the device has been illustrated in connection with plates, the application in this instance being similar to that wherein channels are punched but due to the usual great width of the plates and the position of the holes to be punched, it is necessary that both stop discs 35 threaded on the shaft 31 at the front of the machine be used. During the forward stroke of the work, the guide roller 35 is held in its predetermined gauged position by the outermost stop 35 and during the return stroke of the work the arm 33 is raised and gauged with the other or inner stop 35.

As will be readily apparent, during the punching of one series of holes in the plate the other punch is gagged and vice versa.

From the foregoing description taken in connection with the accompanying drawings, it will be readily apparent to those skilled in the art to which an invention of the character described appertains, that I have provided a means for selectively positioning any desired work ranging from angle iron of most sizes to plates of relatively large widths and that I have provided a machine which is simple in construction and capable of being handled by one man and one which functions in positive manner.

What I claim as my invention is:

1. In a spacing mechanism, including a track, a carriage movable thereover and work holding means carried by the carriage whereby the work moves with the carriage to present successive portions thereof to a tool, a plurality of templets, cooperating means carried by the carriage and templets to arrest the movement of the carriage and work, and automatic means whereby one templet functions during movement of the carriage in one direction and another functions during movement of the carriage in reverse direction.

2. In a spacing mechanism comprising a track, a carriage movable thereover and work holding means carried by the carriage whereby the work moves with the carriage to present successive portions thereof to a tool, a pair of templets, stops arranged thereon, means carried by the carriage to cooperate with the stops of each templet to arrest the movement of the carriage and work, and means whereby the said last-mentioned means cooperating with one templet is in an inactive position while the other is active.

3. In a device of the character described, a movable carriage, a series of stops arranged on each side thereof, and a pair of means carried by the carriage to cooperate with the stops and arrest the movement of the carriage, one of said means being arranged to function during movement of the carriage in one direction and the other during movement in a reverse direction.

4. In a spacing mechanism having means for presenting work to a punching machine whereby holes are punched at predetermined points, gauging means against which the work is held for positioning one series of holes along one longitudinal line during movement of the work in one direction, gauging means against which the work is held for positioning a second series of holes along another longitudinal line during a reverse movement of the work, and means for transversely moving the work to engagement with the second gauging means.

5. In a spacing mechanism having means for presenting work to a punching machine whereby holes are punched at predetermined points, gauging means for positioning one series of holes along one longitudinal line during movement of the work in one direction, gauging means for positioning a second series of holes along another longitudinal line during a reverse movement of the work, means for transversely moving the work to its second gauged position, and means for readily adjusting said gauging means.

6. In a device of the character described, a movable carriage, a series of stops arranged on each side thereof, a pair of means carried by the carriage to cooperate with the stops and arrest the movement of the carriage, and means whereby one of said last-mentioned means is moved to inactive position while the other is moved to its active position.

7. In a device of the character described, a movable carriage, a series of stops arranged on each side thereof, means mounted at each side of the carriage to engage the stops and arrest the movement of the carriage, and pneumatic means for moving one of said stop engaging means to inactive position while the other is moved to its active position.

8. In a device of the character described, a movable carriage, a series of stops arranged on each side thereof, stop engaging means movably mounted at each side of the carriage and adapted to abut the stops to arrest movement of the carriage, and means engageable with one of the stop engaging means to raise the same to its inactive position and allow the other stop engaging means to assume its active position.

9. In a device of the character described, a movable carriage, a series of stops arranged on each side thereof, stop engaging means movably mounted at each side of the carriage, one of said means being adapted to cooperate with the stops carried at one side of the carriage during movement in a forward direction and the other being adapted to cooperate with the stops of the opposite side during a reverse movement of the carriage, and means common to both stop engaging means whereby one of said means is held inactive while the other is active.

10. In a device of the character described, a movable carriage, a series of stops arranged on each side thereof, stop engaging means movably mounted at each side of the carriage, one of said means being adapted to cooperate with the stops carried at one side of the carriage during movement in a forward direction and the other being adapted to cooperate with the stops on the opposite side during a reverse movement of the carriage, means whereby one of said stop engaging means is held in its inactive position while the other is active, and pneumatic means for actuating said last-mentioned means.

11. In a device of the character described, a movable carriage, a series of stops arranged on each side thereof, movable stop engaging means carried by the carriage to cooperate with said stops to arrest movement of the carriage, a transversely slidable member mounted on the carriage and engageable with the stop engaging means, said transversely slidable member being of a length such that when it is engaged with one stop engaging means it is disengaged from the other to raise the first to its inactive position and allow the other to assume its active position, and means for actuating said transversely slidable member.

12. In a device of the character described, a movable carriage, a stop, a stop engaging member carried by the carriage to cooperate with the stop to arrest the movement of the carriage, means for moving the stop engaging member out of the path of the stop to allow the carriage to be moved, and means whereby said stop causes the stop engaging means to be moved to its operative position.

13. In a device of the character described, a movable carriage, a stop, a stop engaging member movably carried by the carriage, means for moving the stop engaging member out of the path of the stop, and a resetting member adapted to abut the stop and move the stop engaging member to its operative position.

14. In a device of the character described, a movable carriage, a series of stops, a stop engaging member movably mounted on the carriage to cooperate with the stops to arrest the movement of the carriage, a member movably mounted on the carriage, means connecting the stop engaging member with the second member for coordinated movement, means for moving the second member to effect movement of the stop engaging member to raise the same out of the path of the stop and permit continued movement of the carriage, and means carried by the second member to cause the stop engaging member to be moved into the path of the next stop.

15. In a spacing mechanism, comprising a track and a carriage movable thereover and having work holding means whereby the work moves with the carriage to present successive portions thereof to a tool, a pair of templets arranged one on each side of the movable carriage, a series of stops carried by each templet, stop engaging means carried by the carriage to cooperate with the stops to arrest the movement of the carriage and work, one of said stop engaging means being in active position while the other is in its inactive position, means for moving the active stop engaging member out of the path of its adjacent stop upon each operation of the tool, means whereby said stop moves the stop engaging member into the path of the next stop, and means for moving the then active stop engaging means to its inactive position and moving the inactive stop engaging means to its active position prior to moving of the carriage in a return direction.

16. In a spacing mechanism having means for presenting work to a punching machine whereby holes are punched at predetermined points, gauging means for positioning one series of holes along one longitudinal line during movement of the work in one direction, means for arresting movement of the work at predetermined intervals to permit holes to be punched at corresponding intervals, gauging means for positioning a second series of holes along another longitudinal line during a reverse movement of the work, means for arresting movement of the work at predetermined intervals during its reverse movement, means whereby one of the means for arresting movement is in its inactive position while the other is active, and means for transversely moving the work to its second gauging position.

17. In a spacing mechanism having means for presenting work to a punching machine whereby holes are punched at predetermined points, a gauging means for positioning one series of holes along one longitudinal line during movement of the work in a forward direction, stop means for arresting movement of the work while being moved in a forward direction, gauging means for positioning the second series of holes along another longitudinal line during a return direction, means for causing one of said stop means to assume an inactive position while the other is active, means for transversely moving the work to its second gauged position, and means for simultaneously actuating said last two mentioned means.

18. In combination with a punching mechanism and means for movably mounting an angle iron, both legs of which are to be punched, for movement past the punching mechanism, of automatic means for gauging the holes to be punched in one leg during a forward movement of the angle iron, and automatic means for gauging the holes in the other leg during the return movement of the angle iron.

19. The combination with a punching machine, of means for longitudinally gauging work as it traverses the machine and including a guide, means for movably mounting the guide, a stop, means for adjustably mounting the stop, and means carried by the guide for engaging the stop whereby the guide is positioned according to the adjustment of the stop.

20. The combination with a punching machine, of means for longitudinally gauging work as it traverses the machine and including a guide, means for movably mounting the guide, a stop, means for adjustably mounting the stop, means carried by the guide for engaging the stop whereby the guide is positioned according to the adjustment of the stop, and graduations for facilitating the adjustment of the stop.

21. The combination with a punching machine, of means for longitudinally gauging work as it traverses the machine and including a guide, means for movably mounting the guide, a plurality of stops, means for adjustably mounting the stops, and means carried by the guide for selectively and detachably engaging any desired stop whereby the work may be gauged according to the adjustment of one stop during the punching of one series of holes, and the guide moved to gauge the work according to the adjustment of another stop during the punching of a second series of holes.

22. In combination with a punching machine and means for moving an angle iron, both legs of which are to be punched, longitudinally past the punching machine with one leg in position to be punched, chuck means for movably supporting one end of the angle iron, means for longitudinally gauging the holes to be punched in the first leg, means for longitudinally gauging the holes to be punched in the other leg, and means whereby the angle and chuck may be turned and moved to engage the second mentioned gauging means and present said other leg to the punching machine.

23. The combination with a punching machine, of a spacing mechanism including a gauge, means for maintaining a piece of work against the gauge to present the work to the punching machine to punch a series of holes at predetermined intervals, a second gauge, means for moving the work after said series of holes has been punched into engagement with the second gauge, to again present the work to the punching machine to punch a second series of holes at predetermined intervals, and means whereby all of said operations are controlled by one operator stationed at the punching machine.

24. The combination with a punching machine, of means for gauging the transverse position of a piece of work with respect to the punch, whereby a series of holes may be punched along one longitudinal line, means for arresting longitudinal movement of the work while traveling in one direction to present predetermined portions of the work to the punch, a second means for gauging the transverse position of the work with respect to the punch, means for moving the work to engagement with said second gauging means whereby a series of holes may be punched along another longitudinal line, and means for arresting longitudinal movement of the work during its travel in a reverse direction to present other predetermined portions thereof to the punch.

25. The combination with a punching machine, of a movable carriage, means for connecting an angle iron with the carriage for movement therewith to present one leg of the angle iron to the punch, means for adjusting said connecting means transversely with respect to the carriage to permit transverse movement of the angle iron with respect to the punch, gauging means whereby holes are punched at predetermined points in said leg, means whereby the angle iron may be turned to present its other leg to the punch without disturbing its connection with the carriage, and gauging means whereby holes are punched at predetermined points in said other leg.

In testimony whereof I have hereunto affixed my signature.

ARTHUR R. POLLASKY.